United States Patent [19]

Marroquin

[11] 4,033,003
[45] July 5, 1977

[54] HEAD FORMING METHOD
[75] Inventor: Emilio R. Marroquin, Lawndale, Calif.
[73] Assignee: Briles Manufacturing, El Segundo, Calif.
[22] Filed: Nov. 7, 1975
[21] Appl. No.: 629,856
[52] U.S. Cl. .................................. 10/10 R; 10/7; 10/26; 10/27 R; 85/45
[51] Int. Cl.² ...................... B23G 9/00; B21K 1/46
[58] Field of Search .............. 10/5, 7, 10 R, 24, 26, 10/27 R; 85/45

[56] References Cited
UNITED STATES PATENTS

| | | | |
|---|---|---|---|
| 2,182,092 | 12/1939 | O'Leary | 10/7 X |
| 2,304,704 | 12/1942 | O'Leary | 85/45 |
| 2,676,510 | 4/1954 | Hodell | 85/45 |
| 2,953,794 | 9/1960 | Klooz | 10/27 H |
| 2,954,719 | 10/1960 | Vaughn | 85/45 |
| 3,540,342 | 11/1970 | Vaughn | 85/45 |

*Primary Examiner*—E. M. Combs
*Attorney, Agent, or Firm*—Albert L. Gabriel

[57] ABSTRACT

A method of providing an undercut "bowtie" slot in the head of a fastener such as a screw or bolt, and the resulting interim and final fastener products. The method consists of only two heading steps, starting with either a preform or a simple blank. In the first heading step a forming blow is applied which produces a "bowtie" shaped slot having side walls that are not undercut and a single, continuous ellipsoidal bulge projecting upwardly from the head adjacent to and substantially coextensive with each edge of the slot. In the second heading step a forming blow is applied which compresses the material of the ellipsoidal bulges down into the head to form a radiused undercut slot configuration that is continuous and substantially coextensive with the length of the slot.

12 Claims, 19 Drawing Figures

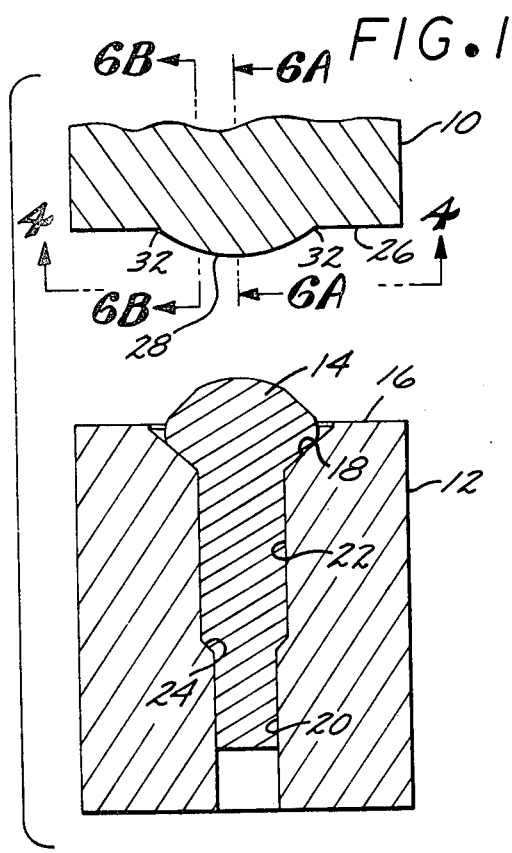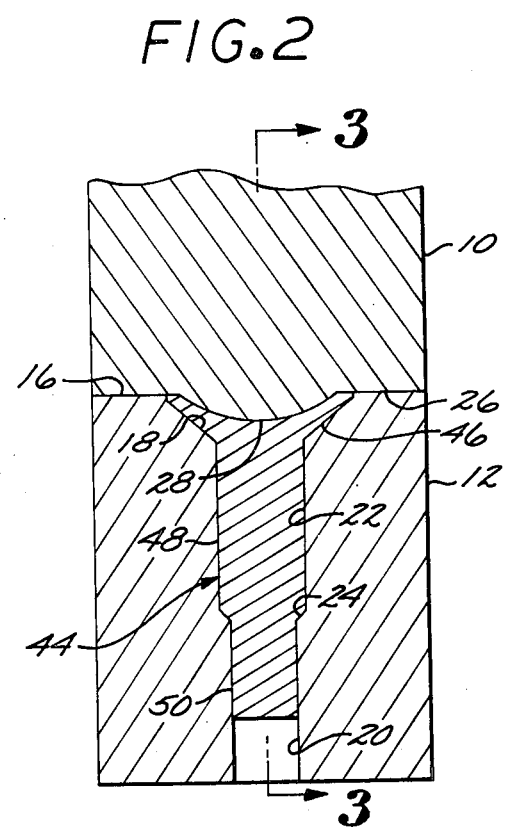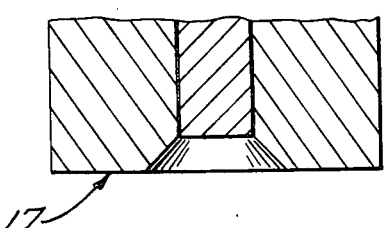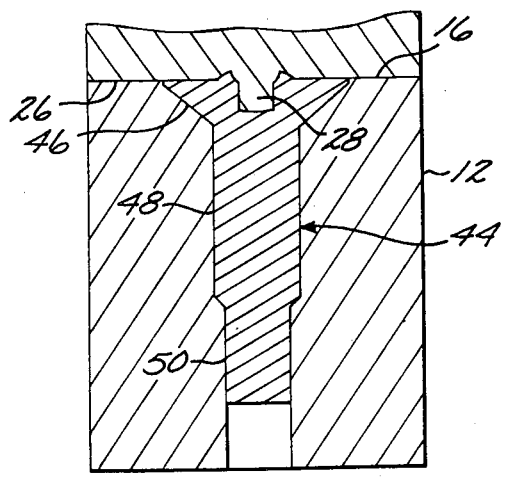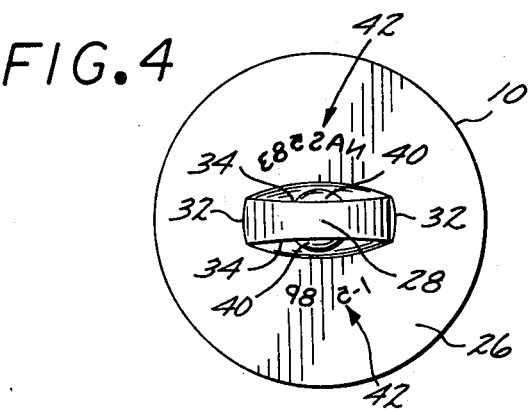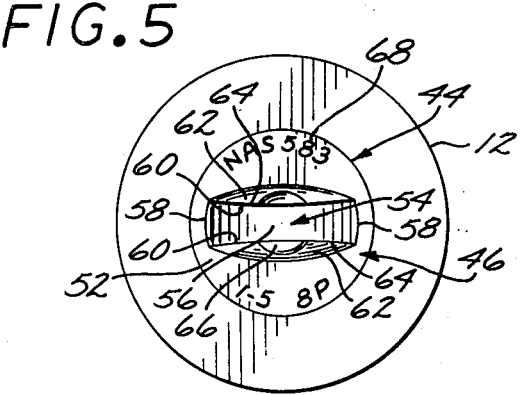

HEAD FORMING METHOD

BACKGROUND OF THE INVENTION

1. Field of the Invention

The invention is in the field of methods for forming high torque fasteners having undercut driving slots, and the resulting interim and final high torque fastener products.

2. Description of the Prior Art

A high torque fastener driving system has been in use for many years wherein a screw or bolt head is provided with a driving-slot of undercut, "bowtie" configuration for cooperation with a driver tool having a driving blade with diverging side walls to prevent camming of the driver blade upwardly out of the slot and thereby permit greatly increased driving torque to be applied to the fastener. Such undercut "bowtie" fastener slots and methods for making the slots, as well as driver tools for use therewith, are shown and described in a number of prior U.S. patents issued to Rudolph M. Vaughn, including U.S. Pat. Nos. 2,677,985, 2,745,120, 2,808,087, 2,864,418, 2,949,949, 2,954,719, 2,994,354, 3,060,565, 3,103,675 and 3,388,411.

For many years, these high torque fastener recesses have been made by a milling process similar to that shown and described in the early Vaughn U.S. Pat. No. 2,677,985, issued May 11, 1954. The milling process used in manufacturing according to the present state of the art is undesirably time-consuming and expensive. Thus, this milling process requires the use of specially designed cutters which have a relatively short life and must be frequently replaced. Further, the cutter or fastener head has to be rotated about its neutral axis to produce the undercut "bowtie" configuration. The rotating cutting motion also creates a distinctive burr as the rotation takes place, and this burr adds an additional deburring operation to the fastener manufacturing process. Additionally, the fastener head has to be identified with an applicable part number, and this part identification step is subsequent and apart from the milling and deburring steps.

In addition to these problems in connection with the conventional milling process for producing undercut "bowtie" high torque fastener slots, the milling process resulted in a product having several serious deficiencies. Thus, the prior art milling process cut and interrupted the grain structure in the fastener head, thus interfering with the integrity of the body of the head material and weakening the head. Further, the prior art undercut milled slot, because of the nature of the milling operation, had side walls that are straight and unradiused in the direction from the bottom to the top of the slot, which resulted in essentially point or line contacting with the mating high torque driver blade, thus applying high stress concentrations to the head during the driving.

One prior art attempt to avoid these problems associated with the conventional milling process by forming the undercut "bowtie" slots in a series of heading steps was set forth in the Vaughn U.S Pat. No. 3,388,411, issued June 18, 1968. This Vaughn forming method required three separate heading blows, a first blow which produced a rounded head with a straight slot, a second blow which flattened the head, applied a "bowtie" configuration to the slot, and provided a double scallop raised bump arrangement along the sides of the slot; and a third blow which flattened the double scallop bumps down to provide undercuts in the flaring parts of the "bowtie". However, it has not been feasible to utilize this Vaughn forming method in the manufacture of high torque fastener parts, for several reasons. The double scallop raised configuration is a difficult shape to make, both in making the double scallop recesses in the second punch member and in making the corresponding parts. A buildup of residue, including lubricant and/or chips of metal, characteristically packs into the punch undercuts for producing the double scallop bumps, and this results in an extremely short punch life and non-uniform product forming. Thus, this residue buildup in the second punch tends to cause incomplete final form part geometry. Additionally, after the third blow the parts will frequently still have raised head portions where the heads are supposed to be flush.

SUMMARY OF THE INVENTION

In view of these and other problems in the art, it is an object of the present invention to provide an improved method for forming an undercut fastener driving slot by heading rather than by conventional milling methods.

Another object of the invention is to provide a novel heading method for forming a fastener driving slot having an undercut "bowtie" configuration.

Still another object of the invention is to provide a heading method for forming an undercut "bowtie" fastener slot which requires that only two forming blows be applied, starting with either a preform or a simple blank.

A further object of the invention is to provide a novel two-step heading method for producing a screw or bolt-type fastener wherein the head of the fastener is formed from a suitable blank in a first heading blow which also prepares the head in an interim part configuration for a final second heading blow that completes the formation of the head and produces an undercut "bowtie" driving slot configuration.

A further object of the invention is to provide a two-step heading method for forming a fastener part with an undercut driving slot, wherein recessed part identification symbols are formed in the head during one of the two heading blows, preferably during the first blow.

A further object of the invention is to provide a simplified two-step heading method for forming an undercut fastener driving slot wherein a header punch employed in the first heading step has concave ellipsoidal pockets for capturing the head material that is compressed down into the head to form the undercut in the second heading blow, which pockets are of a simplified, continuous configuration extending substantially the length of the slot so as to avoid capturing lubricant and/or metal chips that might otherwise interfere with the final forming blow and the resulting product integrity.

A still further object of the invention is to provide an interim fastener part having a head formed with a slot in a first heading step and adapted to have the slot formed to an undercut configuration in a second heading step, such interim fastener part being provided with a single, elongated, generally ellipsoidal bulge of material extending along each side of the slot and adapted to be compressed down into the head during the second heading step to provide lateral bulges in the side walls of the slot defining the undercut slot configuration.

Yet another object of the invention is to provide a fastener part having an undercut "bowtie" slot with side walls that are radiused in the direction from the bottom to the top of the slot to afford increased bearing surface engagement with a mating driver blade.

A further object of the invention is to provide a fastener part having an undercut "bowtie" slot wherein the fastener head proximate the slot has generally continuous grain structure uninterrupted by cutting.

A still further object of the invention is to provide a fastener part with an undercut "bowtie" slot wherein the undercut extends along substantially the entire length of the slot, whereby the overhanging material forming the undercut is continuous along the length of the slot, even including the central region of the slot.

A still further object of the invention is to provide a fastener part having an undercut "bowtie" slot which includes a speed dimple located centrally of the slot, yet wherein the undercut extends through the central part of the slot in the region of the speed dimple.

According to the novel heading method of the invention, only two successive heading steps or blows are required, starting with either a preform or a simple blank. The first heading step involves a forming blow which produces a "bowtie" shaped slot in the part head which has side walls that are not undercut, and produces a single, continuous ellipsoidal bulge that projects upwardly from the head adjacent to and substantially coextensive with each edge of the slot. The second heading step involves the application of a forming blow to the interim fastener part produced by the first heading step, the second heading blow compressing the material of the ellipsoidal bulges down into the head to form a radiused undercut slot configuration that is continuous and substantially coextensive with the length of the slot. A lead-in speed dimple is progressively formed in both the first and second heading steps, and does not interfere with the continuity of either the ellipsoidal bulges of the interim part or the radiused undercut of the completed part. Recessed part identification symbols are applied in the first heading step and remain in the part through the second heading step, and a separate part identification step is not required.

BRIEF DESCRIPTION OF THE DRAWINGS

The invention is more fully described in reference to the following description taken in conjunction with the accompanying drawings, wherein:

FIG. 1 is an axial sectional view illustrating header die and punch apparatus for performing a first heading step according to the invention, with a preform part blank located in the die;

FIG. 1A is an axial sectional view showing a conventional spring loaded upset employed in a preforming step to produce the preform blank shown in FIG. 1;

FIG. 2 is an axial sectional view similar to FIG. 1 but with the punch closed against the die at the completion of the first heading step, with the resulting interim or partially formed fastener part located in the die;

FIG. 3 is an axial sectional view taken on the line 3—3 in FIG. 2;

FIG. 4 is a side view taken on the line 4—4 in FIG. 1 showing in plan view the face of the first punch member shown in FIGS. 1, 2 and 3;

FIG. 5 is a plan view of the head of the interim or partially formed fastener part after the completion of the first heading step, the part being located in the die;

DETAILED DESCRIPTION OF THE PREFERRED EMBODIMENT

Figure 6A:
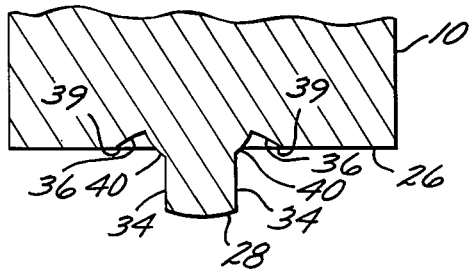
FIGS. 6A and 6B are enlarged partial sectional views taken on the respective lines 6A and 6B of FIG. 1 illustrating details of the first punch member and in particular illustrating the concave ellipsoidal pockets and dimple-forming bulges in the first punch member.

FIG. 1 illustrates a first header punch member 10 operatively positioned in axially spaced relationship to a header die member 12 preparatory to a first heading step according to the present invention. A preform screw blank 14 is shown operatively positioned in the die 12, with a portion of the blank 14 projecting axially upwardly from the flat top surface 16 of the die 12. The screw blank 14 is preformed from a simple cylindrical blank derived from suitable rod stock fed to the heading machine and sheared off and shoved into the cavity of die 12 by conventional heading machine apparatus. The preforming step is a standard procedure in the art, and is accomplished by applying a conventional spring loaded upset 17 such as that shown in FIG. 1A to the top of the simple blank in die 12. Although it is preferred to apply the method steps of the invention starting with a preform blank like the screw blank 14 so as to avoid any possibility of cracking of the head in the region of its frustoconical side surface, it is understood that the method steps of the invention may, if desired, be applied starting directly with a simple cylindrical blank.

The blank 14 may be made of any desired headable metal as for example alloy steel, titanium, inconel, or other. If the blank is made of steel, the two heading steps of the invention may be accomplished by cold heading; while if the blank 14 is of titanium, inconel or other more exotic metal, then the heading steps of the invention are preferably warm heading operations utilizing heating means and temperatures that are well known in the art.

The cavity of header die 12 includes a frustoconical head forming recess 18 at the upper end opening at the flat top surface 16 of the die; an end forming bore 20 in the lower portion of the die 16 for establishing the pre-thread roll diameter on the free end portion of the part being formed; and a shank forming counterbore 22 intermediate the head forming recess 18 and end forming bore 20. The initial simple cylindrical blank rests on an annular shoulder 24 between the counterbore 22 and bore 20 prior to being preformed into the blank 14 by application of the spring loaded upset 17 of FIG. 1A.

FIGS. 1–4, 6A and 6B illustrate the details of construction of the first header punch member 10. The first punch member 10 has a flat primary impact surface 26 which corresponds with the primary head surface of the finished fastener part which, in the illustrated example, is a flat head screw. If the primary head surface of the finished fastener part were to have some other configuration, then the primary impact surface of the first punch member would be altered to have a corresponding configuration.

A slot forming rib 28 projects axially from the flat primary impact surface 26. The slot forming rib 28 has a bottom surface 30 which is arcuate in the longitudinal direction of the rib, the arcuate bottom surface 30 terminating at both ends at junctures with the flat primary impact surface 26 to define the ends 32 of the rib 28. Thus, the rib 28 is convex, being deepest proximate its center portion and becoming shallower toward its ends 32. The bottom surface 30 of slot forming rib 28 also preferably has a slight transverse convex curvature as illustrated in the drawings, but optionally the transverse configuration of the rib bottom surface 30 may be straight.

The side walls 34 of slot forming rib 28 are straight and parallel in the longitudinal direction of the punch member 10; and they are concavely arcuate in the longitudinal direction of the rib 28 so that the rib 28 flares laterally outwardly toward its ends 32 from a relatively narrow central portion to relatively wide end portions in which is referred to in the art as a "bowtie" configuration.

Figure 6B:
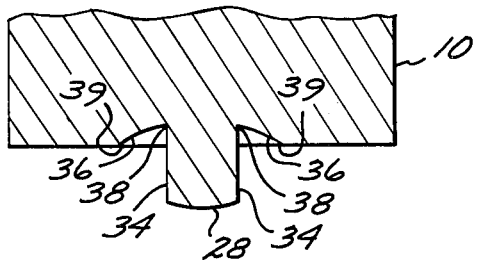

A pair of matching concave pockets 36 of ellipsoidal configuration is provided in the flat impact surface 26 of punch member 10 immediately adjacent the opposite side walls 34 of the rib 28. These ellipsoidal concave pockets 36 extend along the entire length of the rib 28, having their greatest depth proximate the center of the rib 28 in the longitudinal direction of the rib, and curve up to the flat impact surface 26 of punch member 10 at the ends 32 of the rib 28. The concave pockets 36 are deepest along their lengths at the root 38 of the rib 28 as best seen in FIG. 6B, curving laterally outwardly from the root 38 of the rib to curved juncture lines 39 at the flat impact surface 26. These ellipsoidal concave pockets 36 are adapted to capture corresponding bulges of material from the blank 14 in the first forming blow, these bulges in turn providing the overhanging material of the undercut slot in the completed fastener part after the second forming blow by a second header punch member, as described in detail hereinafter.

A pair of dimple-forming bulge sections 40 project outwardly from the respective pockets 36 along the side walls 34 of rib 28 proximate the longitudinal central region of the rib 28 and pockets 36. The bulge sections 40 project axially relative to the punch member 10 from the deepest regions of the concave pockets 36 somewhat beyond the flat impact surface 26 of the punch member 10, and are adapted to form a speed dimple in both the interim or partially formed fastener part which results from the first forming blow and the completed fastener part resulting from the second forming blow, as described in detail hereinafter.

First header punch member 10 is further provided with raised part identification symbols 42 which project from the flat primary impact surface 26, and these form corresponding recessed part identification symbols in the interim or partially formed fastener part produced by the first forming blow and preserved in the completed fastener part after the second forming blow, as described hereinafter.

The interim or partially formed fastener part is designated 44, and is seen in FIGS. 2, 3, 5, 7A and 7B, 8 and 9. The interim or partially formed fastener part 44 is formed in a first heading step wherein the header actuates the first punch member 10 to apply a first forming blow to the blank 14 from the position of FIG. 1 wherein the first punch member 10 is axially spaced from the header die 12 to the position of FIGS. 2 and 3 wherein the first punch member 10 is seated against the header die 12, with the flat primary impact surface 26 of punch member 10 engaged flush against the flat top surface 16 of the die 12. This first forming blow upsets the upper portion of the blank 14 so as to form head 46 on the interim part 44 which fills the head forming recess 18 in die 12. Prior to the first forming blow of the invention, the preforming step employing spring loaded upset 17 has already upset the central portion of blank 14 to substantially form shank 48 of the interim part 44 which fills the shank forming counterbore 22 of die 12, and to extrude the lower end portion of blank 14 into the end forming bore 20 of die 12 to substantially form the reduced end portion 50 of interim part 44 having the prethread roll diameter. If a simple cylindrical blank is used without the preforming step, then the first forming blow of the invention will form the central part of the blank into the shank 48 and extrude the lower part of the blank into the reduced end portion 50 of interim part 44.

The details of construction of the head 46 of interim of partially formed fastener part 44 are best seen in FIGS. 5, 7A, 7B and 8, the upwardly facing portions of head 46 being the complement or mirror image of the downwardly facing impact surface configuration of the first punch member 10. Thus, the interim fastener part head 46 has a flat primary surface 52 corresponding to the flat primary impact surface 26 of punch member 10. The interim part head 46 has a slot 54 formed therein that is complementary to the slot forming rib 28 on punch member 10, the slot 54 including a concave bottom surface 56 that is arcuate in the longitudinal direction of the slot, intersecting the flat primary head surface 52 at slot ends 58; the slot 54 preferably but not necessarily also having a slight transverse concave curvature corresponding to that shown on the slot forming rib 28.

Figure 7A:
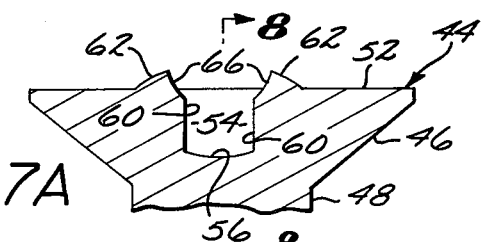
FIGS. 7A and 7B are enlarged partial sectional views corresponding in position to the respective sections of FIGS. 6A and 6B but showing the head configuration of the interim or partially formed fastener part.
Figure 7B:
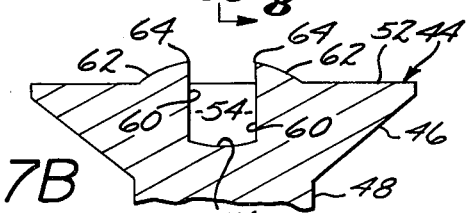

The slot 54 has side walls 60 that are complementary to the side walls 34 of the slot forming rib 28, the slot side walls 60 being straight as best shown in FIGS. 7A and 7B in the longitudinal direction of the shank of the interim part, and being arcuate in the longitudinal direction of the slot 54 as best illustrated in FIG. 5, so that the slot 54 flares laterally outwardly toward its ends 58 from a relatively narrow central portion to relatively wide end portions, in a "bowtie" configuration.

Figure 8:
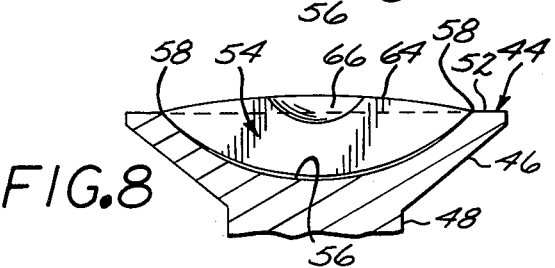
FIG. 8 is a sectional view taken on the line 8—8 in FIG. 7A.

A pair of ellipsoidal bulges project upwardly from the flat primary surface 52 of head 46 immediately adjacent to the opposite sides of the slot 54. These ellipsoidal bulges 62 are formed of the part material which is captured in the respective concave pockets 36 of the first punch member 10. The ellipsoidal bulges 62 have inner, oppositely facing edges defined principally by the side walls 60 of slot 54 as best illustrated in FIGS. 7B and 8, the side walls 60 extending upwardly beyond the flat primary surface 52 of head 46 and terminating at line intersections or junctures 64 with the upper ellipsoidal surfaces of the bulges 62. Thus, the bulges 62 curve laterally downwardly from their highest points along the intersections or junctures 64 with the side walls 60 to curved junctures with the flat head surface 52. The ellipsoidal bulges 62 are elongated in the longitudinal direction of the slot 54, being co-extensive in length with the side walls 60 of the slot 54.

Located axially centrally relative to the longitudinal axis of the interim fastener part 44 is a preformed or interim speed dimple 66 that is complementary to the dimple-forming bulges 40 on the punch member 10. This preformed or interim speed dimple 66 spans the slot 54, displacing some of the material in the central portions of ellipsoidal bulges 62, and extending down into the head 46 adjacent slot 54 below the level of the flat head surface 52.

Part identification symbols 68 are recessed in the flat primary surface 52 of head 46, having been produced by the complementary raised part identification symbols 42 on the punch member 10. These recessed part identification symbols 68 in the interim fastener part 44 remain undisturbed through the forming blow of the second heading step, thereby remaining in the completed fastener part.

Figure 9:
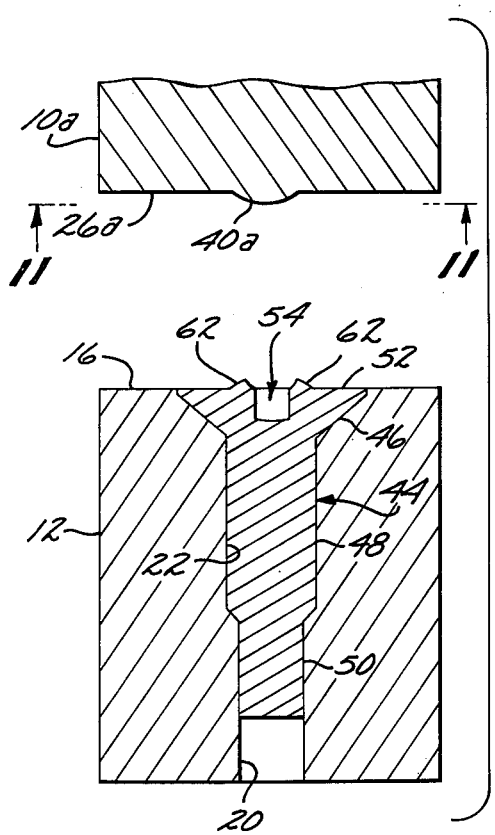
FIG. 9 is an axial sectional view showing the die with the interim or partially formed fastener part therein and a second, final punch member positioned for the second heading step.
Figure 10:
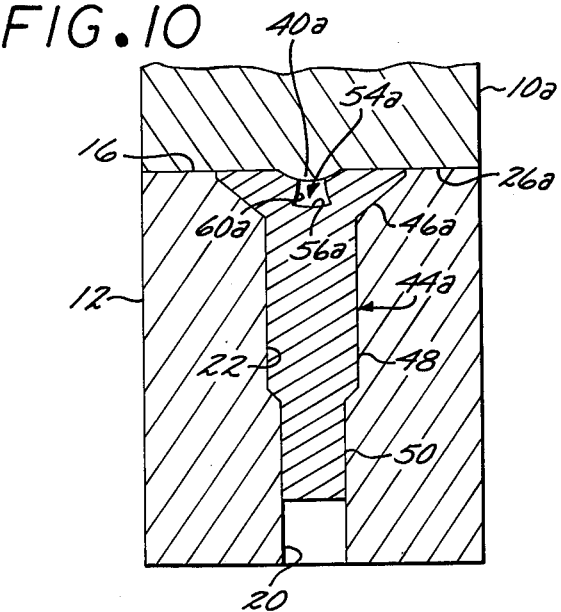
FIG. 10 is a sectional view similar to FIG. 9, but showing the second punch member engaged against the die and the completed fastener part at the end of the second heading step.
Figure 11:
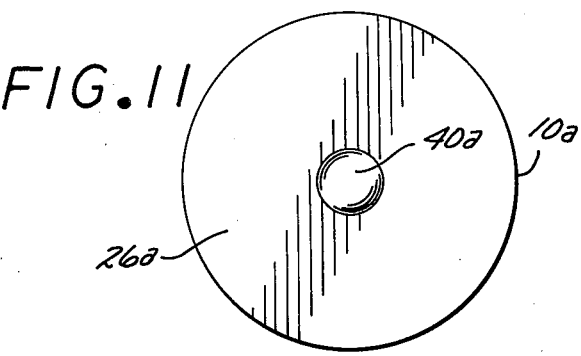
FIG. 11 is a plan view of the face of the second punch member taken on the line 11—11 in FIG. 9.

FIGS. 9 to 11 illustrate the second heading step. After the interim or partially formed fastener part 44 has been produced by the first heading step, the interim part 44 remains in the header die 12 for application of the second heading step. Thus, preparatory to the second heading step, the second or final punch member 10a is disposed in axially aligned, spaced relationship to the header die 12 and interim part 44 as shown in FIG. 9. The second punch member 10a has an impact surface 26a which is completely flat except for central dimple-forming bulge 40a which is adapted to complete the speed dimple that was commenced in the first heading step. In the event that the lead-in capability of a speed dimple is not desired in the final, completed part, then both the dimple-forming bulge sections 40 on the first punch member 10 and the dimple-forming bulge 40a on the second punch member 10a may be omitted. In such event, the impact surface 26a of the second punch member 10a would be a completely flat impact surface.

The second heading step consists simply of the application of a second forming blow to the top of the interim or partially formed fastener part 44 by impacting movement of the second punch member 10a from its spaced position of FIG. 9 to its impacting position of FIG. 10 wherein the flat impact surface 26a of second punch member 10a flattens the top of the head of the fastener part and comes into flush mating engagement with the flat top surface 16 of die 12, and the dimple-forming bulge 40a completes the speed dimple in the axial central region of the head of the part.

The completed fastener part 44a at the end of this second heading step is best illustrated in FIGS. 12–16. The head 46a of the completed fastener part 44a now has a completely flat top surface 52a that is complementary to the flat impact surface 26a on second punch member 10a. When the second forming blow is applied, the predetermined amount of raised material in the ellipsoidal bulges 62 along the sides of the slot 54 in the interim part 44 is compressed down into the head 46a and formed into lateral bulges in the side walls 60a of driving slot 54a in the completed fastener part 44a. These lateral bulges in the side walls 60a overlie the bottom surface 56a of driving slot 54a and are coextensive with the length of driving slot 54a between the slot ends 58a. The dimple-forming bulge 40a on second punch member 10a projects outwardly from the flat impact surface 26a of second punch member 10a further than the bulge sections 40 project beyond the corresponding impact surface 26 on first punch member 10, whereby the bulge 40a on second punch member 10a likewise compresses material downwardly into the head 46a which is deformed laterally into continuous central portions of the lateral bulges in the side walls 60a of driving slot 54a. Thus, the lateral bulges in the side walls 60a of the driving slot are continuous and uninterrupted along the entire length of the driving slot 54a, so that the driving slot 54a is undercut along its entire length between its ends 58a.

Figure 13:
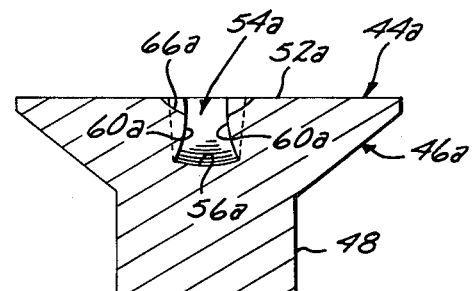
FIG. 13 is a partial sectional view taken on the line 13—13 of FIG. 12.
Figure 14:
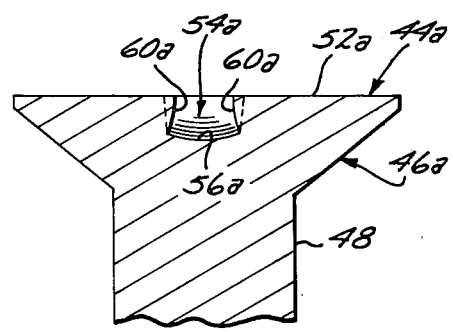
FIG. 14 is a partial sectional view taken on the line 14—14 of FIG. 12.
Figure 15:
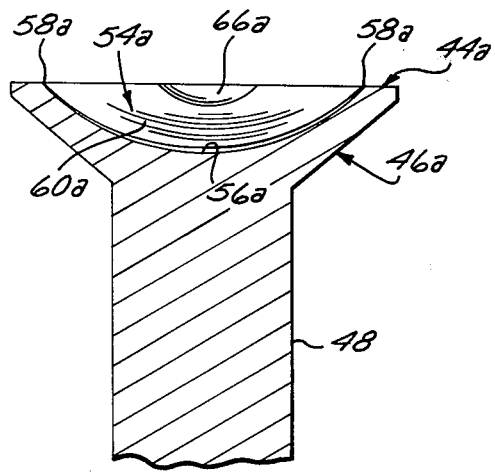
FIG. 15 is a partial sectional view taken on the line 15—15 of FIG. 12.
Figure 16:
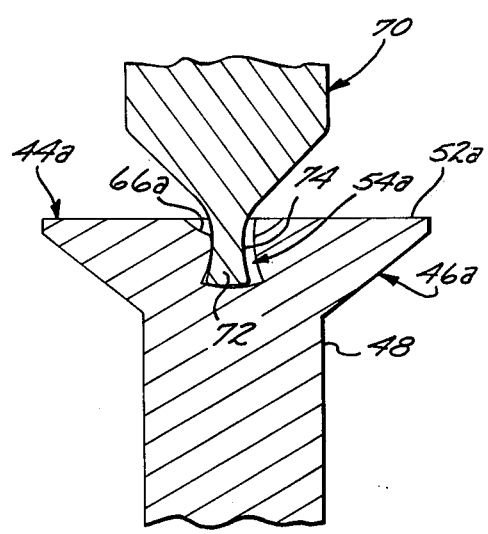
FIG. 16 is a partial axial sectional view illustrating a driver tool engaged in the driving slot of the completed fastener part that is shown in FIGS. 10 and 12–15.

The ellipsoidal configuration of the raised captured material of the bulges 62 on interim fastener part 44 results in the second forming blow by punch member 10a causing the lateral bulges in the side walls 60a of the completed fastener part 44a being radiused convexly as viewed in sections taken transversely of the driving slot 54a and generally longitudinally relative to the longitudinal axis of the completed fastener part 44a, as illustrated in FIGS. 13, 14 and 16 of the drawings. This radiused configuration of the side walls 60a of driving slot 54a is important in that it provides increased driver-to-recess contact surface as illustrated in FIG. 16. A typical high torque driver tool 70 as illustrated in FIG. 16 has a driving blade 72 with sides 74 which are milled out so as to be dished or concave. The generally complementary relationship of these concave driver blade sides 74 against the convex undercut bulges of the side walls 60a in the driving slot 54a of the completed fastener part results in a distribution of driving forces within a substantial region of the head 46a of the fastener part 44a. As can be seen in FIG. 16, the side walls 60a have a greater curvature (smaller radius) than that of the dished sides 74 of the driver tool blade, thus assuring the avoidance of any sharp line or point contacts during fastener driving. The side walls 60a of the fastener driving slot 54a curve outwardly proximate the bottom 56a of the slot to a slightly greater angle relative to the longitudinal axis of the fastener (e.g., 10°) than the maximum angle of the driver blade sides 74 relative to the longitudinal axis of the driver tool (e.g., 9°), thus avoiding line or point contacting near the bottom of the slot.

In contrast, the unradiused, straight side walls of the conventional milled-out undercut slot, which have a greater undercut angle (e.g., 10°) than the angle of the driver tool blade sides (e.g., 9°), are engaged by the driver tool at point or line contacts along the upper edges of the milled-out slot, which tends to result in the application of undesirable stress concentrations in the fastener head.

An important advantage of the simple two-step forming process of the present invention for producing the undercut fastener slot, as compared with the conventional milling process for producing an undercut fastener slot, is that the present forming process produces a continuous, uninterrupted grain structure in the metal of the head, producing a fastener head of greater strength and integrity than the conventional fastener head wherein the grain structure is cut and interrupted by milling out the undercut in the side walls of the slot.

The more positive bearing between the driver tool blade and the radiused undercut slot in a completed fastener part according to the present invention, coupled with the improved head strength and integrity, result in substantially increased recess drivability with the present invention as compared to that of conventional fasteners having milled-out undercut slots.

Figure 12:
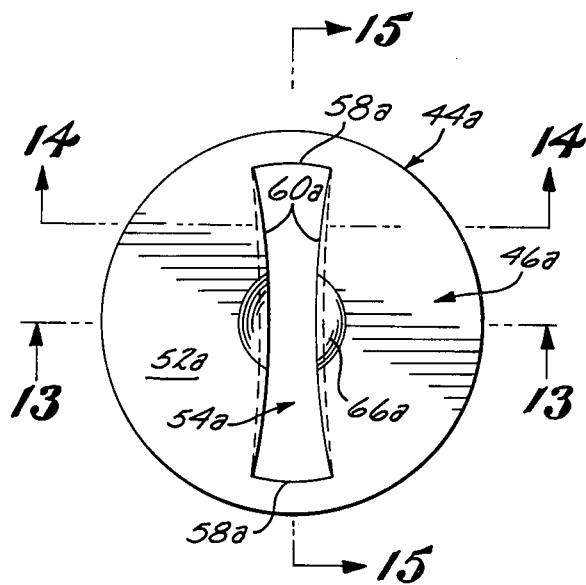
FIG. 12 is a plan view of the head of the completed fastener part.

It will be noted that the undercut in the driving slot 54a of the present completed fastener part 44a extends along the entire length of the slot, even including the central portion thereof, whereas the conventional milled-out undercut slot is only undercut toward the end portions, and not in the central region of the slot. This provides more continuous and hence stronger and more durable overhanging bodies of material above the undercuts in the present invention as compared with prior art milled-out parts. While the depth of the material in these overhanging bodies of material defining the undercuts is somewhat reduced in the central region by the speed dimple 66a in the present invention, nevertheless the overhanging bodies of head material defining the undercut do extend through the region of the speed dimple 66a as best seen in FIGS. 12, 13 and 16.

After the fastener part 44a has been completed by the second forming blow, the second punch member 10a is withdrawn from the part and from the die 12, the part is ejected from the die 12 by application of a conventional knock-out pin (not shown) through the bore 20 of die 12 against the lower end of the completed part, the part is then heat treated, and threads are then rolled onto the reduced end portion 50 of the part. With the two-step forming process of the present invention, it has been found that no final deburring or grinding are necessary.

While the invention has been particularly shown and described with reference to a preferred embodiment thereof, it will be understood by those skilled in the art that various changes in form and details may be made therein without departing from the spirit and scope of the invention.

I claim:

1. A method of forming an undercut slot of "bowtie" configuration in the head of a fastener which comprises the steps of:
    applying a first header punch member to said head to form a primary head surface with a "bowtie"-shaped slot recessed below said surface and a single bulge of material projecting upwardly from said surface adjacent to each side of said slot, each of said bulges of material being elongated in the longitudinal direction of the slot and continuously convexly curving from a greatest height above said primary surface proximate the slot down to an intersection with said primary surface spaced from said slot, and
    applying a second header punch member to said head to compress said bulges of material down into the head below the level of said surface laterally displacing and forming material of the head into a single, elongated lateral bulge in each side of the slot to produce an undercut slot configuration between said lateral bulges, said curvature of each of said upwardly projecting bulges causing each of said lateral bulges to convexly curve in the direction from the bottom to the top of the slot.

2. A method of forming an undercut slot in the head of a fastener as defined in claim 1, wherein said first and second punch members are applied to said head in respective first and second cold heading steps.

3. A method of forming an undercut slot in the head of a fastener as defined in claim 1, wherein said first and second punch members are applied to said head in respective first and second warm heading steps.

4. A method of forming an undercut slot in the head of a fastener as defined in claim 1, wherein:
    each of said upwardly projecting bulges of material is formed by said first punch member along substantially the entire length of its respective side of said slot, and
    each of said lateral bulges is correspondingly formed by said second punch member along substantially the entire length of its respective side of said slot.

5. The method of forming an undercut slot in the head of a fastener as defined in claim 1, wherein each of said upwardly projecting bulges of material is formed by said first punch member into a generally ellipsoidal configuration.

6. The method of forming an undercut slot in the head of a fastener as defined in claim 1, wherein said slot is formed by said first punch member with a bottom which is concavely arcuate in the longitudinal direction of the slot.

7. The method of forming an undercut slot in the head of a fastener as defined in claim 1, wherein one of said first and second punch members applies recessed part identification symbol means in said primary head surface.

8. The method of forming an undercut slot in the head of a fastener as defined in claim 7, wherein said first punch member applies said recessed part identification symbol means in said primary head surface laterally spaced from said upwardly projecting bulges.

9. The method of forming an undercut slot in the head of a fastener as defined in claim 1, wherein at least one of said first and second punch members forms a speed dimple in said head in communication with said slot proximate the center of the slot.

10. The method of forming an undercut slot in the head of a fastener as defined in claim 9, wherein both of said first and second punch members form said speed dimple in said head.

11. The method of forming an undercut slot in the head of a fastener as defined in claim 9, wherein said first punch member forms said speed dimple at least partially in the material of said upwardly projecting bulges.

12. The method of forming an undercut slot in the head of a fastener as defined in claim 1, wherein said first punch member forms said primary head surface to a flat configuration.

* * * * *